United States Patent [19]
Kalmar

[11] 3,818,859
[45] June 25, 1974

[54] APPARATUS FOR COATING FRUIT
[75] Inventor: Arthur F. Kalmar, 4714 Jurupa Ave., Riverside, Calif. 92506
[73] Assignee: FMC Corporation, San Jose, Calif.
[22] Filed: Feb. 6, 1973
[21] Appl. No.: 330,133

Related U.S. Application Data
[62] Division of Ser. No. 181,490, Sept. 17, 1971, abandoned.

[52] U.S. Cl.......... 118/24, 118/DIG. 6, 118/DIG. 16
[51] Int. Cl............................................. B05b 13/02
[58] Field of Search ... 118/24, 25, DIG. 6, DIG. 16, 118/308, 312; 117/104 R; 239/220

[56] References Cited
UNITED STATES PATENTS

| | | | |
|---|---|---|---|
| 506,389 | 10/1893 | Claus | 118/DIG. 16 |
| 629,513 | 7/1899 | Liebscher | 118/324 |
| 1,191,912 | 8/1916 | Sanburn | 117/104 R UX |
| 1,882,439 | 10/1932 | Murphy | 118/DIG. 16 |
| 2,372,225 | 3/1945 | Rieke | 118/DIG. 6 |
| 2,866,709 | 12/1958 | Gerwe et al. | 118/DIG. 6 |
| 3,374,768 | 3/1968 | Lawes et al. | 118/308 |
| 3,411,441 | 11/1968 | Hermack et al. | 101/148 |

*Primary Examiner*—Morris Kaplan
*Attorney, Agent, or Firm*—R. S. Kelly; C. E. Tripp

[57] ABSTRACT

Fruit are sprayed with an ultralow volume spray of a protective coating material by means of a rotary brush, which is arranged to pick up small quantities of the coating material upon the bristles thereof, and a rigid flipper bar, which is arranged to engage the liquid-laden bristles of the brush as the brush rotates to cause the bristles to flip the coating material therefrom in the form of a fine mist spray that descends upon the fruit.

3 Claims, 3 Drawing Figures

PATENTED JUN 25 1974 3,818,859
FIG_1
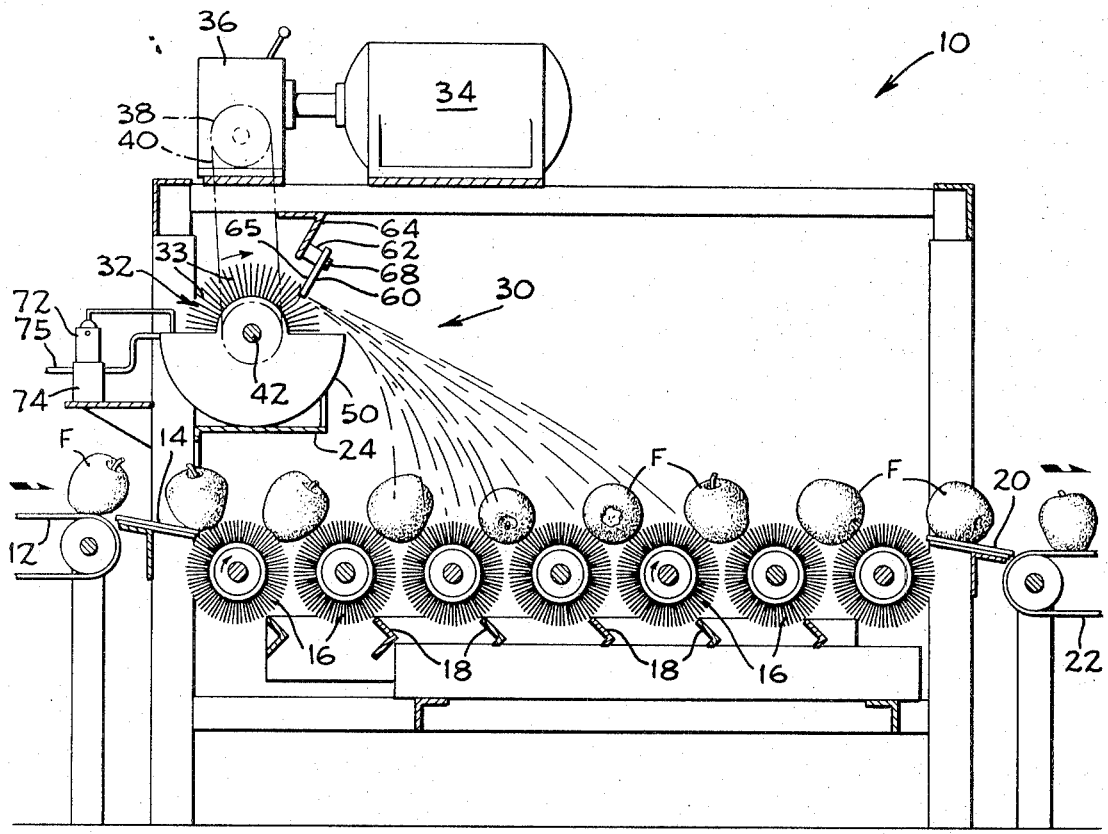
FIG_2
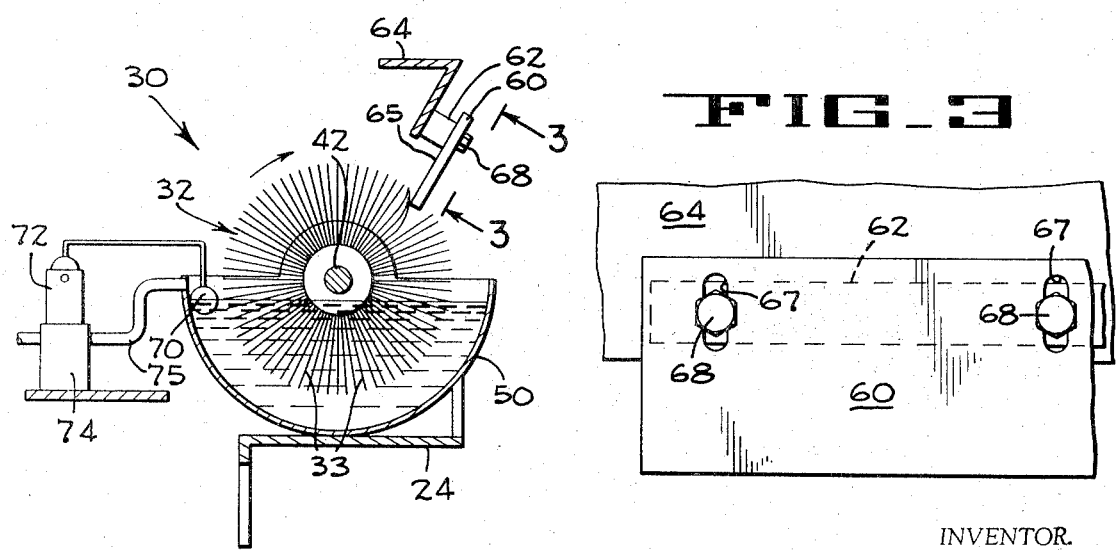
FIG_3
INVENTOR.
ARTHUR F. KALMAR
BY F.W. Anderson
R.S. Kelly
ATTORNEYS

APPARATUS FOR COATING FRUIT

This is a division of application Ser. No. 181,490, filed Sept. 17, 1971, now abandoned.

BACKGROUND OF THE INVENTION

1. Field of the Invention

In general, this invention pertains to that field of art concerned with and apparatus for coating articles such as fruit or vegetables, and more particularly, it pertains to and apparatus for applying low volume spray coatings to fruit or vegetables.

2. Description of the Prior Art

A problem exists in creating a low volume spray from conventional spray nozzles particularly when the material being sprayed is a high density liquid material such as the waxes, fungicidal dispersions, or other protective coatings which are applied to fresh fruit and vegetables. A very thin film of wax should be provided upon the surface of the fruit in order to enhance the appearance of the fruit and prevent the loss of or access of water while the fungicides are applied in order to preserve the fruit from decay. When using a high density liquid material, the orifices of conventional spray nozzles tend to become plugged when they are restricted so as to provide a very low volume spray.

Probably the most satisfactory low volume nozzle presently commercially available is the pneumatic atomizing nozzle. This nozzle uses separate jets of liquid and air with the air dispersing or atomizing the tiny droplets of liquid and forcing them out through a restricted orifice. However, even with such a spray nozzle, the limitations on minimum orifice size to prevent plugging require a greater amount of material to be sprayed per unit of time than is generally necessary in fruit coating operations.

An alternative way of applying a wax emulsion or other high density liquid coating material to fruit or the like is by foaming the material and applying it to the fruit in the nature of a foam which can be deposited directly upon the fruit. However, when a very low density foam is used, a selective separation of the dispersed solid material occurs, and not all of the fruit will be properly or uniformly coated.

SUMMARY OF THE INVENTION

The present invention comprises a low volume spray apparatus which is particularly adapted to apply a mist spray of a high density liquid, such as the conventional wax coating and fungicidal materials, to the surfaces of fruit and vegetables or the like. Basically, the invention comprises a rotary brush which is mounted for slow continuous rotation in a position adjacent to the fruit to be sprayed. The coating material is placed in a container which is located so that a peripheral segment of the brush travels therethrough to pick up small quantities of the liquid material on the radially extending bristles. A rigid flipper bar is located in a position to contact the brush bristles when they are rotated out of the liquid container. The flipper bar deflects the bristles as they are rotated, and, when the bristles pass the bar, their natural resiliency will cause them to spring back into their normal radially extending positions thereby causing the small quantities of liquid thereon to be ejected in a spray of very small droplets. By proper relative positioning of the brush and the fruit, an ultralow volume spray of coating material can be continuously delivered to the fruit.

BRIEF DESCRIPTION OF A DRAWING

FIG. 1 is a longitudinal section through the coating apparatus of the present invention.

FIG. 2 is an enlarged transverse section through the coating applicator shown in FIG. 1.

FIG. 3 is an enlarged plan taken in the direction of the arrows 3—3 of FIG. 2 and illustrating the adjustable mounting of the flipper bar.

DESCRIPTION OF THE PREFERRED EMBODIMENT

Apparatus for carrying out the fruit coating method of the present invention is shown in FIG. 1. It will be noted that the fruit F are fed (in the direction of the arrows) through an enclosed housing 10 from a delivery conveyor 12 which deposits them in continuous random fashion upon an inclined inlet ramp 14. The fruit are propelled longitudinally through the housing by means of a plurality of aligned rotary brushes 16. These brushes are continuously rotated (in the clockwise direction as viewed in FIG. 1) by conventional means such as shown, for example, in prior U.S. Pat. No. 2,866,709 to Gerwe et al. The brushes, which are typically formed from a soft horsehair material, are provided to rotate the fruit while moving them gently through the housing without damage thereto. As is well known, special brush contours may be utilized to achieve positive progression of and individual separation of the fruit. Underlying the brushes are a plurality of inclined plates 18 which may drain any excess coating material from the brushes 16 and deliver it to an underlying trough. At the discharge end of the housing there is provided an inclined ramp 20 which receives the fruit from the brushes and delivers it to a take-away conveyor 22.

The spray coating applicator 30 for applying the spray to the fruit is mounted upon a bracket 24 attached to the front wall of the housing 10 and is positioned above the fruit conveying brushes 16 so that the spray will descend down upon the fruit in an area of at least two or more brush widths, as shown in FIG. 1. The spray coating applicator 30 is best shown in FIG. 2 and will be seen to comprise a rotary brush 32 having radially extending bristles 33. The brush 32 is mounted transversely to the conveying path upon the side walls of the housing (by means not shown) in a position generally parallel to the fruit conveying brushes 16 so that it rotates continuously in the same direction as the fruit conveying brushes. In order to provide for this continuous rotation, a motor 34 is mounted upon the top of the spray housing 10 and is utilized to drive, through a gear reducer 36, a sprocket 38. A drive chain 40 connects the sprocket 38 with a shaft 42 upon which the brush 32 is mounted. The gear reducer 36 is of the variable speed type so that the rotational speed of the brush can be readily adjusted to that speed desired.

Mounted upon the bracket 24 is a semicylindrical trough 50 which receives the liquid fruit coating material to be sprayed onto the fruit. It will be noted, particularly from FIG. 2, that the lower portion of the brush 32 is received within the trough 50 so that the bristles 33 will pick up a film of liquid from the trough as the brush is rotated therethrough. In the event that certain wax emulsion or fungicidal dispersion coating materials are used which might tend to separate, the bottom of the brush 32 should be maintained as close as possible to the bottom of the trough, i.e., with a clearance of one-half inch or less, so that the liquid material will be continuously agitated to prevent such separation.

The spray condition is provided by a rigid flipper bar 60 which is fixedly mounted by means of an elongated mounting block 62 upon an angle iron 64 that extends transversely of the housing 10 at the top thereof. The flipper bar i positioned above the applicator brush 32 and slightly forwardly thereof so that the bristles move down into the rearward face 65 of the bar, as shown in FIG. 2. When engaged by the bar the bristles are deflected rearwardly about the lower sharp corner thereof as shown, and, as the brush continues to rotate, the natural resilience of the bristles will cause them to be snapped forwardly when they are free of the flipper bar. This snapping, or flipping, action of the bristles causes the liquid which is received thereon to be thrown forwardly and to descend upon the fruit in a very fine droplet or mist spray.

As shown in FIG. 3, the flipper bar is provided with a series of slots 67 so that it can be adjustably mounted upon the underlying mounting block 62. Bolts 68 which are threaded into the mounting block 62, are received through the slots 67 to fasten the flipper bar to the mounting block. When it is desired to adjust the position of the flipper bar so as to shift the lower end thereof relative to the brush and thereby determine the amount of flipping movement given to the individual bristles, the bolts 68 may be loosened and the flipper bar moved upwardly or downwardly with respect to the mounting block.

It is important that the brush bristles be fairly stiff and have a good deal of resiliency, and it is, of course, important that the bristles maintain these characteristics after extended periods of use. While many different types of bristles may be used for the spraying application aforedescribed, nylon or vinyl bristles of about 0.012 inches in diameter have been found to provide superior results and to give a good flipping action so as to cause very fine droplets of spray to be ejected to the fruit. It has also been found that the length of the bristles should be at least ⅝ inches in order to provide a good flipping action. The peripheral speed of the applicator brush 32 should be relatively low, e.g., in the neighborhood of one inch per second, if a good low volume spray is desired. So long as the bristles are stiff and provide good flipping action, the rotary speed of the brush may be kept quite low.

The amount of coating material which is applied to the individual fruit by the coating applicator 30 of the present invention can be regulated in a number of ways. As shown, the gear reducer 36 is easily adjusted to change the rotary speed of the brush and thereby directly determine the volume of spray delivered to the fruit. Also, the spray can be regulated by changing the applicator brush 32 so as to alter the number of bristles per unit area around the core of the brush or the stiffness or shape of the bristles. The amount of coating material which is delivered to the fruit can further be regulated by altering the viscosity of the coating material. The coating area of the spray should cover from about ten to thirty inches in the longitudinal direction or about two to six widths of the conveying brushes 16 shown in FIG. 1. Obviously, the rotary applicator brush 32 can be of any diameter.

In order to maintain a constant supply of coating material within the trough 50, a conventional level sensing means and fluid supply means might be used as shown. A float 70 is provided in the surface of the liquid within the trough which float is utilized to actuate a solenoid 72 which operates a valve member 74 to supply additional liquid coating material to the trough through fluid inlet line 75 when the liquid within the trough drops below a predetermined level.

It will be seen that the spray coating apparatus of the present invention provides a means whereby an extremely small amount of a solution, dispersion or emulsion can be applied to fruits and vegetables in a continuous coating process. The volume of the spray can be readily adjusted by a number of different means. It will be recognized that high density fluids can be delivered in low volume with the apparatus of the present invention and that the problems associated with low volume spray nozzles are not encountered by the apparatus of the present invention. Finally, it will be noted that the apparatus of the present invention is relatively simple and economical to produce and that it will not require excessive maintenance or repair to keep it in good running order.

Although the best mode contemplated for carrying out the present invention has been herein shown and described, it will be apparent that modification and variation may be made without departing from what is regarded to be the subject matter of the invention.

What is claimed is:

1. In a spray applicator including a plurality of parallel conveyor rollers spaced in a generally horizontal plane for conveying a plurality of fruit or vegetables in a longitudinal path, an enclosed housing encompassing said conveyor rollers, means for delivering said fruit or vegetables to said conveyor rollers at one end of said housing, means for continuously rotating said conveyor rollers as they move in said longitudinal path in order to continuously rotate said fruit or vegetables carried by said rollers to present all sides thereof to an overhead spray, and means for receiving said fruit or vegetables from said conveyor rollers at the other end of said housing, the improvement comprising a rotary brush having a plurality of bristles extending radially therefrom, means for mounting said brush in a stationary position within said housing above said conveyor rollers and generally parallel thereto with the rotary axis of the brush extending transversely of said path, means for continuously rotating said brush at a relatively slow peripheral speed of about one inch per second or less, a container adapted to receive a supply of a high density liquid protective coating material, means for mounting said container so that it extends parallel to said brush with a longitudinal segment of said brush being received within the material in said container whereby the bristles in said segment receive said coating material thereon, and a fixed flipper bar mounted parallel to and forwardly of said brush with the lowermost edge of said bar being in a position to engage the outer edges of said bristles at a location spaced circumferentially from said longitudinal segment of the brush, means for regulating the volume of spray delivered to said conveyor rollers including means for adjusting said flipper bar to directly vary the depth of penetration of the bar in said bristles, said bristles being relatively stiff and possessing a resilience such that they quickly return to their normal postions after being deflected by said flipper bar thereby causing said coating material on the bristles to be ejected therefrom in the form of a fine mist spray which descends upon the fruit on said conveying rollers, said bristles being formed of a hard material and having a diameter of about 0.012 inches, said bristles each having a length of at least 5/8 inches, said brush being spaced vertically from said conveyor rollers by a sufficient distance so that said spray descends upon the fruit on the rollers over an area having a dimension of at least two brush diameters measured in the direction of movement of the conveyor rollers, said longitudinal segment of said brush received within said container having the bristles thereof disposed in closely spaced relation to said container thereby to promote mixing of said liquid coating material.

2. The spray applicator of claim 1 including means for maintaining a substantially constant level of coating material in said container.

3. The spray applicator of claim 1 wherein said container is of semi-cylindrical shape and wherein the bristles of said brush extend to within about one-half inch from the interior wall of the container.

* * * * *

UNITED STATES PATENT OFFICE
CERTIFICATE OF CORRECTION

PATENT NO. : 3,818,859
DATED : June 25, 1974
INVENTOR(S) : ARTHUR F. KALMAR

It is certified that error appears in the above-identified patent and that said Letters Patent are hereby corrected as shown below:

Column 1, line 7, delete "and".

Column 1, line 9, delete "and".

Column 1, line 58, after "bristles" insert --which are formed of a hard material and are relatively stiff--.

Column 1, line 58, after the period insert --The peripheral segment of the brush received within the container has the bristles thereof disposed in closely spaced relation to the container in order to promote mixing of the high density liquid material in the container.--.

Column 1, line 62, after "to" insert --quickly--.

Column 1, line 68, after the period insert --This volume of spray material can be varied particularly by adjusting the relative position of the flipper bar and the brush.--.

Column 3, line 8, "i" should be --is--.

Column 4, line 65, "postions" should be --positions--.

Signed and Sealed this sixteenth Day of September 1975

[SEAL]

Attest:

RUTH C. MASON
*Attesting Officer*

C. MARSHALL DANN
*Commissioner of Patents and Trademarks*